(12) United States Patent
Ten (10) Patent No.: US 8,736,840 B1
(45) Date of Patent: May 27, 2014

(54) METHOD FOR FINDING AN AIM POSITION OF A MEASURING DEVICE

(76) Inventor: Arkady Ten, Sunnyvale, CA (US)

(*) Notice: Subject to any disclaimer, the term of this patent is extended or adjusted under 35 U.S.C. 154(b) by 668 days.

(21) Appl. No.: 12/785,462

(22) Filed: May 23, 2010

(51) Int. Cl.
*G01B 11/00* (2006.01)
*G01B 11/14* (2006.01)
*G01J 3/46* (2006.01)
*G01J 3/52* (2006.01)

(52) U.S. Cl.
USPC ........... 356/401; 356/402; 356/421; 356/614; 356/620

(58) Field of Classification Search
None
See application file for complete search history.

(56) References Cited

U.S. PATENT DOCUMENTS

| | | | | |
|---|---|---|---|---|
| 4,505,589 A * | 3/1985 | Ott et al. | | 356/402 |
| 5,149,960 A * | 9/1992 | Dunne et al. | | 250/226 |
| 5,200,817 A * | 4/1993 | Birnbaum | | 358/518 |
| 5,285,297 A * | 2/1994 | Rose et al. | | 358/518 |
| 5,339,176 A * | 8/1994 | Smilansky et al. | | 358/504 |
| 5,481,380 A * | 1/1996 | Bestmann | | 358/504 |
| 5,537,516 A * | 7/1996 | Sherman et al. | | 358/1.9 |
| 5,818,960 A * | 10/1998 | Gregory et al. | | 382/167 |
| 6,075,888 A * | 6/2000 | Schwartz | | 382/167 |
| 6,765,674 B2 * | 7/2004 | Orelli et al. | | 356/402 |
| 8,334,978 B2 * | 12/2012 | von Orelli | | 356/402 |
| 8,395,809 B2 * | 3/2013 | Engler et al. | | 358/1.5 |
| 2004/0136015 A1 * | 7/2004 | Van de Capelle et al. | | 358/1.9 |
| 2005/0281459 A1 * | 12/2005 | Bala et al. | | 382/162 |
| 2007/0139672 A1 * | 6/2007 | Klassen | | 358/1.9 |
| 2010/0141970 A1 * | 6/2010 | Couwenhoven et al. | | 358/1.9 |

* cited by examiner

*Primary Examiner* — Gordon J Stock, Jr.

(57) ABSTRACT

One embodiment of a method for finding an aim position of a measuring device may include building a color model for an imaging device, initializing a color encoding image, displaying or printing the image on the imaging device, acquiring measurement with the measuring device, converting the measurement into imaging device code values using the color model, calculating said aim position from said device code values. The color encoding image sets one-to-one relationship between coordinates and colors. The image is output on the imaging device and measured by the measuring device. The measurement is converted using the color model to the device code values. The aim position then calculated from position of the device code values in the encoding image.

20 Claims, 7 Drawing Sheets

METHOD FOR FINDING AN AIM POSITION OF A MEASURING DEVICE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

The application relates to imaging device calibration and characterization, specifically to finding an aim position of a measuring device.

2. Prior Art

The area of the invention is related to color calibration and profiling as well as other areas where measurement of light reflecting or emitting devices is involved. In order to conduct a measurement of an area of interest (usually a color patch) a measuring device (colorimeter, densitometer, spectrophotometer or other light sensing device capable of color discrimination) should be aimed to the patch with required accuracy.

Commonly an operator aims the measuring device to an area of interest. For example, some calibration/characterization software applications and systems show the location where the operator should place or aim the measuring device. In other applications and systems position of the measuring device is fixed and position of the patch is ensured by hardware. For example in printers and presses with installed measuring devices, the position of paper is ensured by paper guides with certain tolerance.

However in many case it is beneficial to determine the aim position of the device automatically. Once the aim position of the device is known color patches can be display or printed in that specific position.

For example, some computer monitor calibration software places sequence of white patches on a monitor screen and conducting measurement in order to find a position of the device on the screen. However, this method requires a significant number of measurements.

Thus device aiming can be done manually or automatically. The manual device positioning requires intervention of a human operator and thus significantly limits automation. On the other hand existing algorithms of locating of the aim position of the measuring device requires several measurements and is not time efficient since measurement acquisition is a slow process.

SUMMARY

According to one embodiment a method of finding an aim position of a measuring device comprises building or assuming a color model for imaging device, creating color encoding image, displaying or printing the image, acquiring a measurement, converting the measurement to code values using the color model, calculating the aim position.

REFERENCE NUMERALS

102 Measuring system
104 Measuring device
106 Imaging device
108 Controlling device
202 Computer monitor
204 Computer
206 Color patch
208 On-screen measuring device
302 Free-standing measuring device
402 Area
402 Aperture of measuring device
502 Rectangles
504 Red corner rectangle
506 Magenta corner rectangle
508 Black corner rectangle
510 Green corner rectangle
602 Border position
604 Aperture radius
606 Left rectangle
608 Right rectangle
702 Create imaging device model
704 Create color encoding image and output it on imaging device
706 Measure and convert the measurement using imaging device model
708 Calculate aim position of measuring device

DETAILED DESCRIPTION

Figure 1:
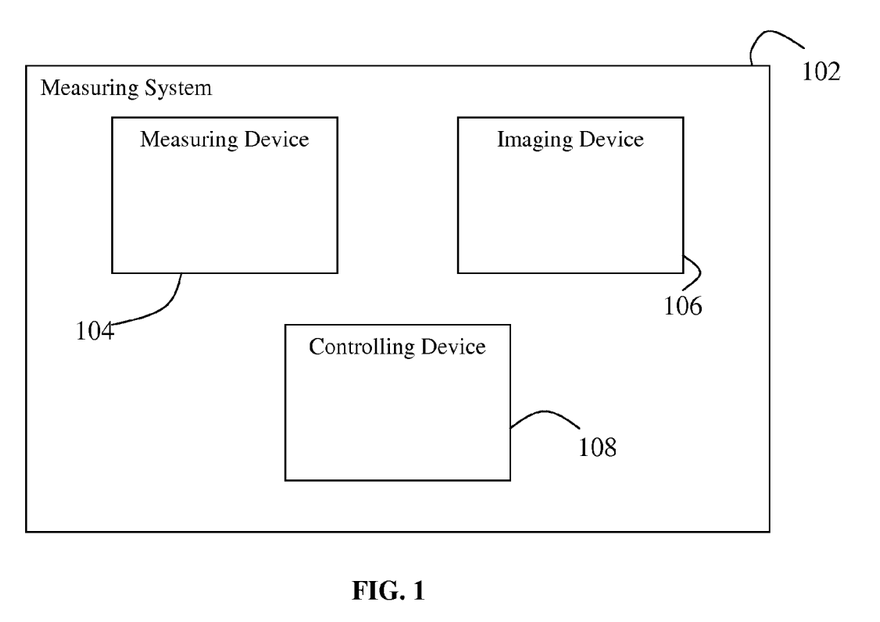
FIG. 1 shows components of a typical measuring system.

FIG. 1 shows an exemplary measuring system 102 comprising a measuring device 104, an imaging device 106 and a controlling device 108. The controlling device 108 controls the imaging device 106 and the measuring device 104. An exemplary controlling device may be a computer or a microcontroller or any other digital or analog circuitry capable of executing a described later method and its variants.

Figure 2:
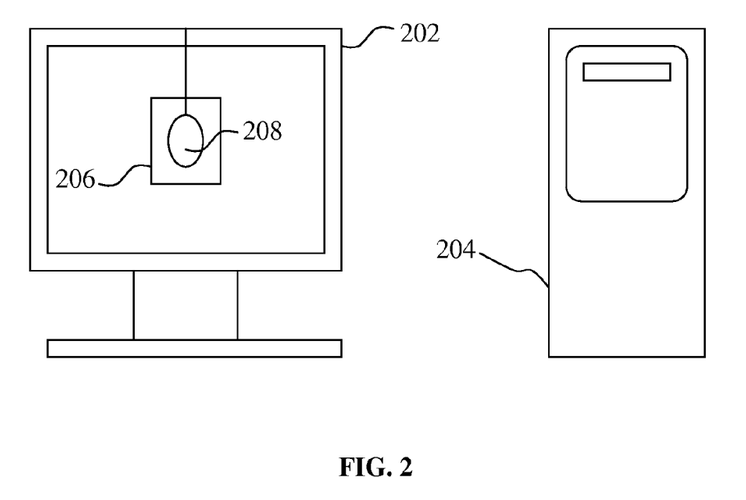
FIG. 2 shows an example of a measuring system and placement of an on-screen measuring device.

FIG. 2 illustrates one embodiment of the measuring system 102 where the imaging device 106 is a computer monitor 202 and a controlling device 108 is a desktop computer 204. The computer shows a color patch 206 on the monitor and then triggers the measuring device 208 to acquire a measurement of the color patch on the monitor. Some imaging devices contain an embedded computer or controller and an internal or external measuring device. Such imaging devices are also examples of a measuring system 102.

Imaging devices are characterized by imaging surfaces, the surfaces where images are printed or displayed. The imaging devices can produce a variety of colors on their imaging surfaces. In one example an imaging device can be a computer monitor with its imaging surface being the monitor screen. In another example, the imaging device can be a projector with its imaging surface being a projection surface. In yet another example, the imaging device can be a printer with its imaging surface being printed media.

Measuring devices relevant to this application are capable of color, light intensity or spectral discrimination. Colorimeters, densitometers and other light sensing devices are examples of such measuring devices. The majority of the measuring devices are characterized by limited aperture or in other words the devices measure light coming only from certain directions. Thus a surface of interest and a measuring device should be positioned in such way that the surface of interest completely fills the aperture of the measuring device.

Figure 3:
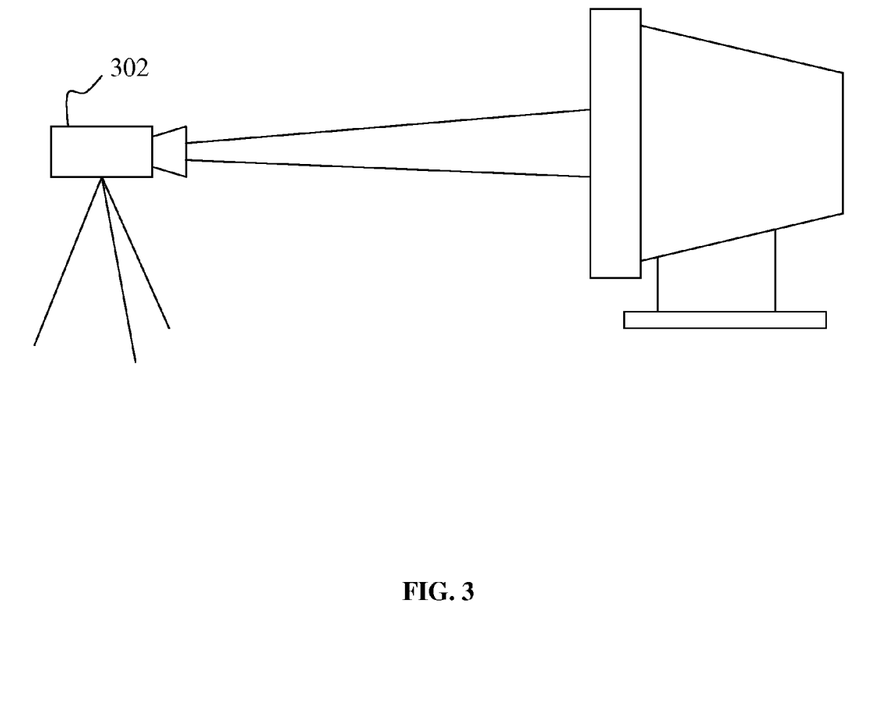
FIG. 3 shows example of free-standing measuring device positioning.

As shown on FIG. 2 an onscreen measuring device 208 should be place over a color patch 206 shown on a monitor screen 202. A free-standing measuring device 302 should be aimed to the color patch as it shown on FIG. 3. Alternatively, the position and correspondingly the aim of a measuring device can be fixed and a color patch should be printed in a proper position and placed in such way to fill the aperture of the measuring device. Such an approach is commonly implemented in printers and presses equipped with measuring devices.

From here on it is assumed that measuring devices are pre-positioned and aimed to some undetermined position on an imaging surface of an imaging device and the aperture of the measuring device is completely filled with some part of imaging surface.

The above described properties of imaging devices and measuring devices can be utilized to determine an aim position of a measuring device on an imaging surface of an imaging device automatically. In particular, the imaging surface can be logically partitioned on non-overlapping areas. Every area is described by distinctive coordinates, a shape and sizes. For example a rectangle is the most common shape for an imaging surface. The rectangle can be partitioned into set of rectangles, triangles or any other suitable shapes or a combination of thereof.

At the same time, every area can be assigned a distinctive color that is displayed or printed in the area. Thus a specific area can be found by its coordinates or by its color. Since all areas have distinctive coordinates and distinctive colors the relationship between the coordinates and the colors of the areas can be described by a one-to-one relationship. Mathematically such relationship allows for unambiguous recovery of the coordinates from the colors and vice versa. Essentially it is equivalent to creating a discreet coordinate grid and color coding or color tagging it. For example, from the color measured by a measuring device one can tell which area the measuring device points to and infer approximate coordinates of the aim position of the device. Due to discrete nature of partitioning the aim position is determined within tolerances that are determined by the shape and the sizes of the area.

Figure 4:
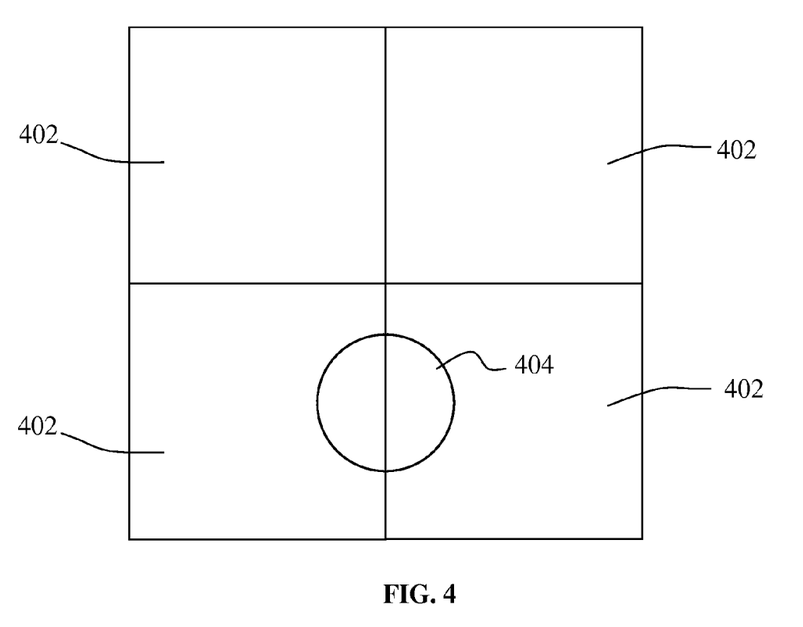
FIG. 4 illustrates a possible position of a measuring device aim position, where the aperture of the device includes two areas.

FIG. 4 shows that two or more areas 402 can be present in the aperture 404 of the measuring device. In that case the measurement reported by the measuring device corresponds to neither the left area nor the right area. In order to still be capable of the aim position recovery it is required that color coding was gradual and monotonic relative to the coordinates on an imaging surface.

Figure 5:
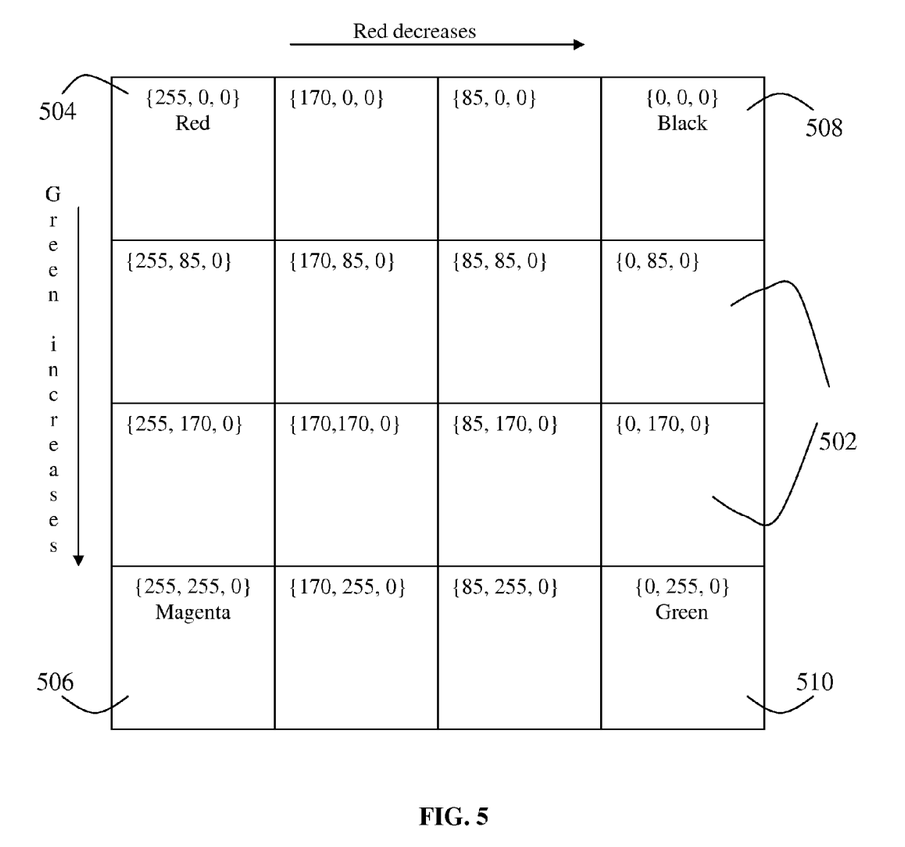
FIG. 5 shows an example of color encoding for an imaging device.

FIG. 5 exemplifies such gradual and monotonic color coding for an RGB imaging device. As can be seen from the figure, the imaging surface is divided on rectangles 502 and every rectangle is assigned an RGB values. Red values decrease to the right of the imaging surface of the imaging device, while green values increase toward the bottom of the imaging surface with corner colors being red 504, magenta 506, black 508 and green 510. As a result every rectangle has a unique color and colors of the rectangles gradually changing from a rectangle to a rectangle.

Figure 6:
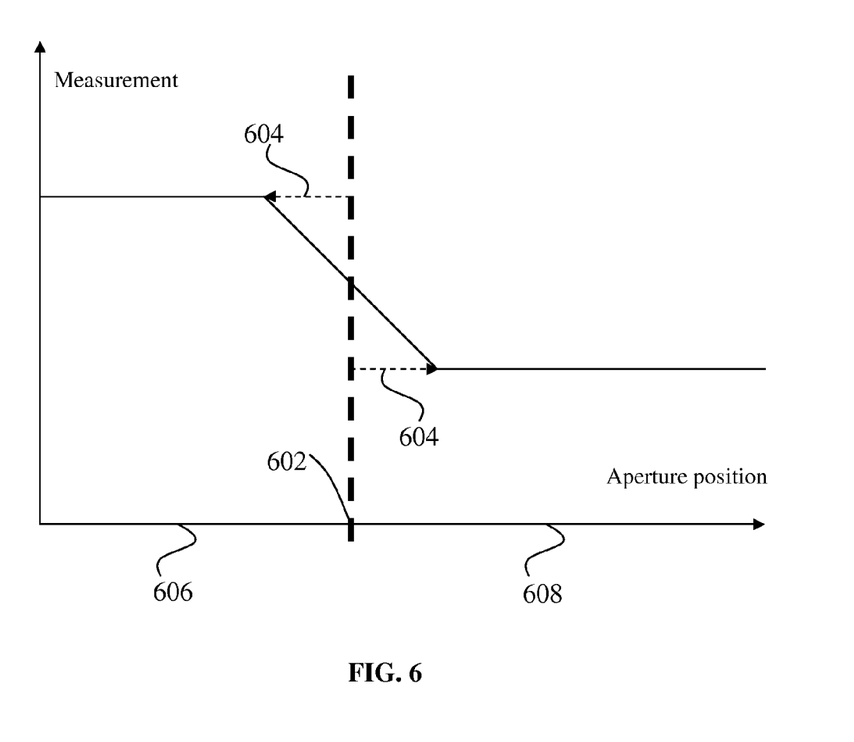
FIG. 6 illustrates relationship between reported measurements and a position of a measuring device relative to a border between areas of an encoding image.

FIG. 6 shows approximate relationship between measurements reported by the device and the device position relative to the border 602 between the rectangles 606 and 608. It is assumed that measurement units are proportional to amount of light passing through the aperture of the measuring device e.g. CIE XYZ or spectrum. As portrayed by the FIG. 6 the device reports the measurement of the left-to-the-border rectangle 606 if the aperture of the device is fully filled with the color of the left rectangle 606. However, as soon as the right rectangle 608 appears in the aperture the reported measurement is changed toward the measurement of the right rectangle. The larger the portion of the right rectangle 608 becomes in the aperture the closer the reported measurement is to the measurement of the right rectangle. FIG. 6 shows that the reported measurement is influenced by a neighboring rectangle if distance to the border less than radius of the aperture 604.

Figure 7:
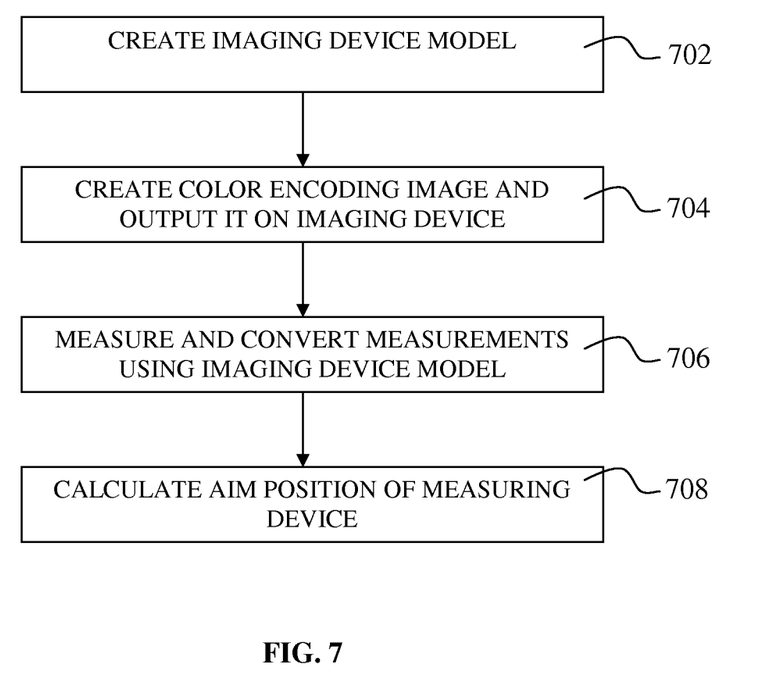
FIG. 7 shows a flow chart of an embodiment of method of finding an aim position of a measurement device.

FIG. 7 illustrates an example method of finding an aim position of a measuring device. Firstly, a color model of an imaging device 702 is created. The model allows for conversion between measurement space (CIE XYZ, spectra and so on) and device codes values that control the imaging device. In one embodiment the model can be built base on measurements. If measurements required, color patches need to be big enough to ensure that they are in the aperture of a measuring device since the location of the aim point of the measuring device is not known. For example, for an on-screen measuring device it is advisable to fill the screen of the imaging device with the patch colors. An approximate model based on few measurements may suffice in many cases.

In another embodiment the model can be built from preexisting data. The data may be measurements from earlier characterizations or may be a preexisting color profile.

In yet another embodiment the assumed model may provide adequate accuracy. For example, many monitors may be simulated by the sRGB standard. Similar generic color models can be used for other imaging devices.

Secondly, a color encoding image is created and output on the imaging device 704. The size and shape of the encoding image should be reasonably close to those of the imaging surface. The encoding image may be smaller than the imaging surface. For example, on-screen measurement devices usually can not be correctly placed close to the border of a computer monitor. Thus an area of possible position of the device aperture is smaller than the imaging surface.

As portrayed by FIG. 5, the encoding image is partitioned on smaller areas and every area is assigned a unique color to create a gradually changing color pattern. The number of areas depends on the accuracy of the model and how large is the error a system can tolerate in finding the aim position. For example imaging surface of a 19-inch computer monitor is approximately 38 cm by 30 cm. In many cases it is acceptable to know the aim position within 2 cm. Thus the areas should be no more than 4 cm along the longest side. To meet this requirement the imaging surface should be partitioned into 10 by 8 rectangles. Thus the pattern should contain at least 80 colors that the model and the measuring device should reliably discriminate.

The higher the color gradient in the formed pattern the less accurate modeling and measurement are required. Thus it is advisable to choose colors in such way that the corner colors were spread as far as possible in the measurement space. The device model can be used to aid selection of the colors. Once the corner colors are set the rest of the colors can be determined by for example interpolation. The resulting encoding image then shown or printed on the imaging surface.

Once the image is on the imaging surface, the controlling device triggers the measuring device and acquires the measurement 706. The measurement is transformed into device code values 706 by means of the device model built on the step 702. For example, the measuring device can be a colorimeter that typically provides measurements in CIE XYZ units and the imaging device can be a RGB monitor driven by RGB triplets. In such case the device model transforms the XYZ measurement into RGB code values.

The RGB code values from 706 are matched against the encoding image created on step 704 and coordinates of the aim position are inferred (708). For example, RGB code values of {255, 0, 0} correspond to upper left rectangle of FIG. 5. Thus the aim point of the measuring device is located in the upper left rectangle.

The RGB code values may correspond to a weighted sum of RGB code values of neighboring rectangles. As shown in FIG. 6 that means that the aim point is on the border 602 between rectangles 606 and 608.

The transformation of the measurement into the code values is not exact and highly depends on the accuracy of the model. For example if a patch with the RGB code values of {255, 0, 0} is measured and then the measurement is transformed by the model the resulting RGB code values may not be {255, 0, 0}. Thus when matching two code values inexact match should be used. Two sets of code values are considered inexactly matching if a value of a set forth matching function on the two sets meet a set forth criterion. For example, Euclidean distance can be used to assess the match. In such case two code values match if there are within a specified distance from each other.

Figure 8:
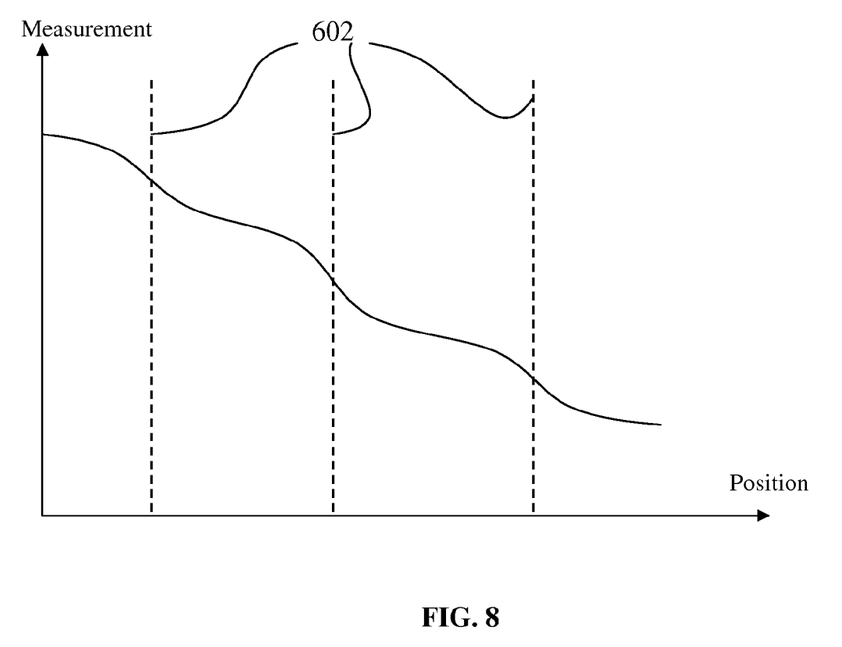
FIG. 8 shows relationship between reported measurements and an aim position when partitioning is smaller then an aperture of a measuring device.

In some cases the encoding image can be constructed in such way that the coordinates of the image surface are encoded into the code values of the encoding image. For example if partitioning shown on FIG. 5 is done in such way that rectangles are smaller than aperture then measurements dependency on position does not contain extended flat areas. FIG. 8 shows an example of such dependency. In that case position of can be directly calculate from RGB values. Assuming that upper left corner is origin of the coordinate system (similarly to shown in FIG. 5) and the encoding image fill the imaging surface, the x coordinate can be calculated as (1−(Red code value)/255)*Imaging Surface Width.

The number of colors a model can discriminate depends on the accuracy of a measurement device and the accuracy of the model itself. If the model lacking the accuracy the number of reliably discriminated colors is limited. For example, an sRGB model is inaccurate for some computer monitors. The number of colors the model can reliably discriminate may be inadequate to support the above described method. In such cases the encoding image use fewer colors and the partitioning results in large areas. To maintain the accuracy of the aim position determination the method described above can be repeated with smaller size of encoding image. For example if only four colors available the encoding image may contain four distinctly colored rectangles. The image is displayed or printed and then measurement is taken and the rectangle that is in the aim is recovered. However the aim position can be in any point of the rectangle. To find the aim position more precisely the algorithm may be repeated. This time the size and position of the encoding image should be approximately of those the earlier found aimed rectangle. Thus the aimed rectangle partitioned on four smaller rectangles, measurement is taken and a new aimed rectangle is found. The process is repeated till the aim position is found with the required accuracy.

Advantages

From the description above, a number of advantages of some embodiments my method of finding an aim position of a measuring device become evident:

(a) Fewer measurements are required to find the aim position. For example, only one measurement is required to find the aim position if the color model is built on accurate preexisting data.

(b) If the model lacks of accuracy an iterative variant of the method allows for accurate yet fast finding the aim position.

(c) The method is not technology specific and virtually all imaging devices can be use with the described above method.

I claim:

1. A method of finding an aim position of a measuring device comprising:
    building a color model for an imaging device;
    initializing a color encoding image;
    displaying or printing said color encoding image on said imaging device;
    acquiring a measurement of said displayed color encoding image or said printed color encoding image with said measuring device;
    converting said measurement into imaging device code values using said color model;
    calculating said aim position from said imaging device code values.

2. The method of claim 1 wherein the building a color model includes building the color model using measurements of said imaging device.

3. The method of claim 1 wherein the initializing of a color encoding image includes using a preexisting color encoding image.

4. The method of claim 1 wherein colors of the color encoding image change gradually and monotonically.

5. The method of claim 1 wherein the aim position is calculated directly from the imaging device code values.

6. The method of claim 1 wherein the aim position is inferred from inexact matching the imaging device code values with code values of said color encoding image that comprises:
    a) calculating code values using said device color model and said measurement
    b) setting forth a matching function for two sets of code values
    c) setting forth a matching criterion
    d) calculating value of the matching function based on every distinct set of code values of said encoding image and said imaging device code values
    e) comparing said value of the matching function with said criterion
    f) accepting a match for two sets of code values if said value of the matching function meets said matching criterion.

7. The method of claim 1 wherein the building a color model includes building the color model using a preexisting model.

8. The method of claim 7 wherein said preexisting model is a model of a generic imaging device.

9. The method of claim 7 wherein said preexisting model is a color profile.

10. A method of finding an aim position of a measuring device comprising:
    a) building a color model for an imaging device
    b) initializing a color encoding image of a specified size and number of distinct code values c) displaying or printing said color encoding image on said imaging device in a specified position d) acquiring a measurement of said displayed color encoding image or said printed color encoding image with said measuring device e) converting said measurement into imaging device code values using said color model f) calculating said aim position based on said imaging device code values g) setting a new size and position of the color encoding image h) repeating steps (b) through (g) till an aim position found with required accuracy.

11. The method of claim 10 wherein the size of the color encoding image is reduced with every iteration.

12. The method of claim 10 wherein the position of the color encoding image is set to the aim position determined on the prior iteration.

13. The method of claim 10 wherein the building a color model includes building the color model using measurements of said imaging device.

14. The method of claim 10 wherein the initializing of a color encoding image includes using a preexisting color encoding image.

15. The method of claim 10 wherein colors of the color encoding image change gradually and monotonically.

16. The method of claim 10 wherein the aim position is calculated directly from the imaging device code values.

17. The method of claim 10 wherein the aim position is inferred from inexact matching the imaging device code values with code values of said color encoding image that comprises:

a) calculating code values using said device color model and said measurement b) setting forth a matching function for two sets of code values c) setting forth a matching criterion d) calculating value of the matching function based on every distinct set of code values of said encoding image and said calculated code values e) comparing said value of the matching function with said criterion f) accepting a match for two sets of code values if said value of the matching function meets said matching criterion.

18. The method of claim 10 wherein the building a color model includes building the color model using a predetermined model.

19. The method of claim 18 wherein said predetermined model is a model of generic imaging device.

20. The method of claim 18 wherein said predetermined model is a color profile.

* * * * *